United States Patent [19]
Bergstedt

[11] 3,735,873
[45] May 29, 1973

[54] APPARATUS FOR SCREENING AQUEOUS SUSPENSIONS, PREFERABLY FIBER STOCK AND/OR FIBER-PULP SUSPENSIONS

[75] Inventor: Karl Erik Bergstedt, 86100 Timra, Sweden

[73] Assignee: Sunds Aktiebolag, Sundsvall, Sweden

[22] Filed: June 2, 1970

[21] Appl. No.: 42,675

[30] Foreign Application Priority Data

June 10, 1969 Sweden ..................................8264/69

[52] U.S. Cl..................................210/415, 209/273
[51] Int. Cl. .............................................B01d 29/42
[58] Field of Search..............................210/405, 415; 209/273

[56] References Cited

UNITED STATES PATENTS

| | | | |
|---|---|---|---|
| 3,311,235 | 3/1967 | Ahlfors et al. | 210/94 X |
| 3,275,156 | 9/1966 | Valtanen et al. | 210/415 |
| 1,973,864 | 9/1934 | Biffar | 209/273 |
| 3,081,873 | 3/1963 | Cowan et al. | 209/273 |
| 3,508,651 | 4/1970 | Hooper | 209/273 X |
| 3,363,759 | 1/1968 | Clarke-Bonner | 210/415 X |
| 1,921,750 | 8/1933 | Heinrich et al. | 209/273 |

*Primary Examiner*—John Adee
*Attorney*—Pierce, Scheffler & Parker

[57] ABSTRACT

An improvement in apparatus for screening aqueous suspensions and being of the type having a perforated, diluting-liquid cylinder adapted to rotate inside a co-axial, perforated, non-rotatable screening drum, and with which means are provided for supplying diluting liquid and suspension mixtures to the cylinder and drum respectively, the improvement being that the means which causes the diluting cylinder to rotate is at least partially enclosed by the means supplying said liquid to the cylinder and that means are provided for imparting to the liquid, prior to its entry into said cylinder, a determined speed of rotation, thereby preventing uneven distribution in the apparatus of the suspended material.

7 Claims, 4 Drawing Figures

PATENTED MAY 29 1973  3,735,873

APPARATUS FOR SCREENING AQUEOUS SUSPENSIONS, PREFERABLY FIBER STOCK AND/OR FIBER-PULP SUSPENSIONS

The present invention relates to an improvement in apparatus intended for screening aqueous suspensions, preferably fiber stock and/or fiber-pulp suspensions and being of the type which are provided with a non-rotatable screening means mounted substantially horizontally in a casing, the screening means preferably being in the form of a cylindricial drum having a perforated surface and the end walls of which are either fully or partially open to provide for communication with a means for feeding the aqueous suspension to the interior of the drum and with a means for carrying away reject, i.e. particles separated from the suspension during the screening operation, and which are also provided with a cylinder adapted to receive diluting liquid, the cylinder also having a perforated surface and being rotatably mounted substantially horizontally within the screening drum and connected to diluting liquid supply means and being adapted to supply, as it rotates, the diluting liquid fed thereto to the interspace between the cylindrical surface of the screening drum and the diluting-liquid cylinder.

One serious disadvantage with screening apparatus of the type is that, as the fiber suspension passes through the screening drum, the percentile content of fibers in the suspension increases in a direction towards the discharge end of the drum. Furthermore, this increase in the fiber content of the suspension is so great that it deleteriously affects the screening result.

The object of the present invention is to eliminate this disadvantage, which is achieved by providing a screening apparatus of the type referred to with an improved arrangement for supplying diluting liquid to the screening apparatus which causes the diluting liquid to be set into rotation prior to entering the screening drum.

The improvement provided by the present invention is mainly characterized in that the diluting-liquid cylinder is supported by a rotatable member which is at least partly surrounded by the means which supplies the diluting liquid.

The invention will now be described in detail with reference to an embodiment thereof illustrated in the accompany-ing drawing, further characteristic features of the invention being disclosed in connection therewith.

Figure 4:
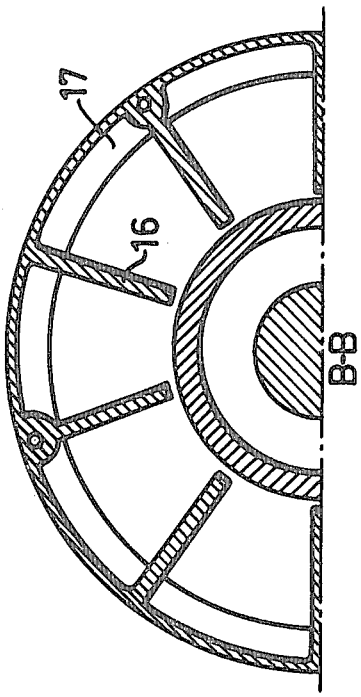
Figure 1:
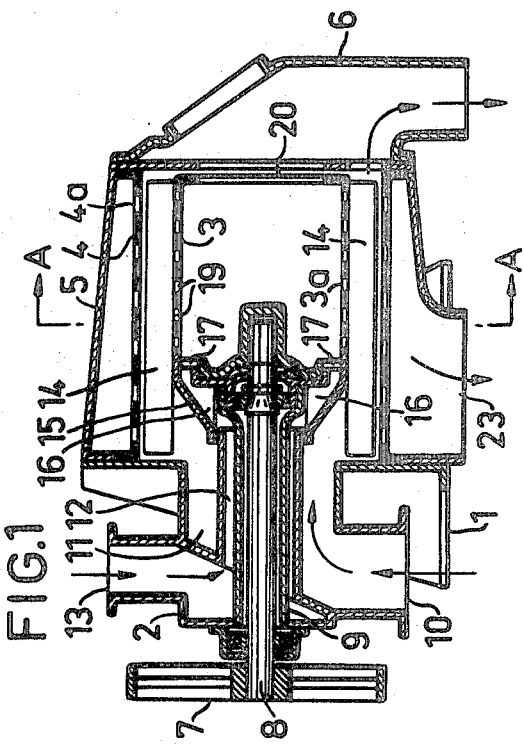
FIG. 1 is a longitudinal section through a screening apparatus according to the invention.
Figure 3:
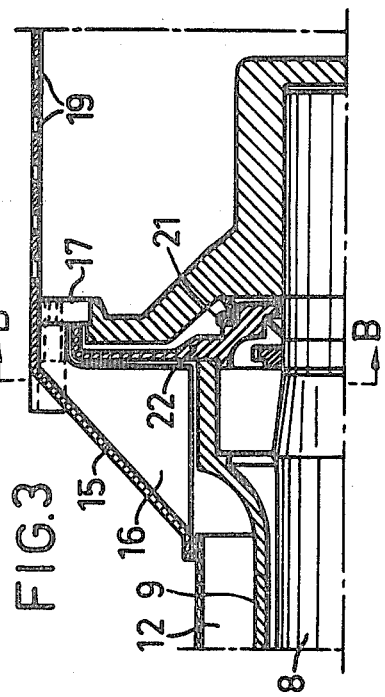
FIG. 3 shows in larger scale a portion of the section illustrated in FIG. 1.

and FIG. 4 shows a section taken through the line B—B in FIG. 3.

The screening apparatus illustrated in the drawing includes a frame 1, a suspension charging means 2 and an inner cylinder 3 for receiving diluting liquid. The cylinder 3 has preferably an undivided but perforated, at 3a, peripheral surface and is substantially horizontally mounted for rotation within a horizontally mounted, non-rotatable outer screening drum 4. The cylindrical surface of the drum 4, similar to the cylinder 3, is also undivided but provided with perforations 4a.

The drum and cylinder are both enclosed in a common casing 5, which is suitably made of a plastic material and secured to the frame 1 in a manner which enables it to be removed axially without it being necessary to dismantle the screening drum 4. This enables the screening drum to be inspected as a whole from without. The screening drum 4 is also attached to the frame 1 in a manner which permits it to be removed axially without dismantling. Connected to the casing 5 is a means 6 for carrying away the reject arriving from the screening drum 4, the reject being in the form of particles which, because of their size and shape, are unable to pass through the perforations 4a in the cylindrical surface of the drum 4. The reference numeral 7 in the drawing identifies means for driving a rotatable shaft 8 which supports the diluting liquid cylinder 3 and which is arranged in a sleeve 9. In the shown embodiment, the diluting-liquid cylinder 3 is supported in cantilever fashion solely by the shaft 8 and its bearings. Although this embodiment is to be preferred, the cylinder can, however, also be supported at its free end, it being ensured that when so supported the cylinder is still free to rotate. The concept of the invention also embraces an embodiment of the screening apparatus in which the diluting-liquid cylinder is not self-supporting, but is supported throughout.

For the purpose of supplying the aqueous suspension to the interior of the drum 4, the apparatus embodying the improvement of the present invention is provided with a pipe 10 which cooperates with an inlet 11, and connected to the cylinder 3 and substantially surrounding the supporting shaft 8 and the sleeve 9 is an inlet 12 which cooperates with a connecting pipe 13 for continuously supplying to the interior of the cylinder 3 diluting liquid of suitable concentration for the purpose of obtaining the best possible screening effect.

Figure 2:
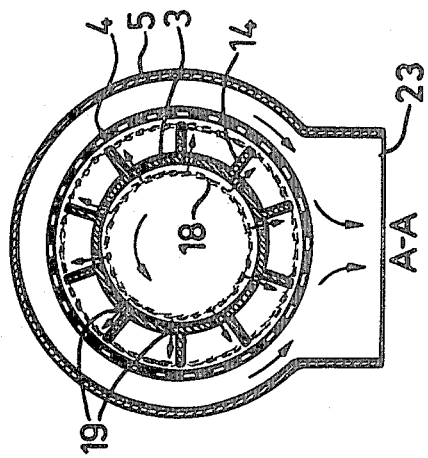
FIG. 2 is a section taken through the line A—A in FIG. 1.

In the shown embodiment, the connecting pipe 13 is arranged in diametrically opposed relation to the suspension supply pipe 10. Arranged externally of the diluting liquid cylinder 3 is a number of radially positioned blades or the like 14 which, as the cylinder 3 rotates, cause the screening drum 4 to vibrate, thereby preventing the perforations 4a in the cylindrical surface of the drum from being blocked by the fibrous material. Also connected to the diluting-liquid cylinder 3 is a cover or liquid-inlet chamber 15, which is essentially frusto-conical in shape and which is, in effect, a continuation of the inlet 12, said chamber being connected to the inlet 12 preferably while leaving a small peripheral gap therebetween. The liquid-inlet chamber 15, which is thus capable of rotating together with the diluting liquid cylinder 3, has arranged therein a number of guide vanes 16, and between the cover 15 and the interior of the cylinder 3 there is provided a number of passages or openings 17, through which the diluting liquid is passed into the diluting liquid cylinder 3. As the diluting-liquid cylinder 3 rotates, the liquid present therein forms a solid of rotation 18 (FIG. 2), from which the liquid is thrown out by centrifugal force through a number of openings 19 disposed in the cylindrical surface of the diluting-liquid container 3. When seen in the direction of rotation of the cylinder, the openings 19 open out immediately behind the blades 14, and present a through-flow area which is adapted to prevent the liquid rotating in the diluting-liquid container from rising to a level at which it can pass through an opening 20 arranged in the end wall of the cylinder. The purpose of the opening 20 is to permit in a simple manner visual examination of the liquid supplied to the cylinder, with regard to possible changes in quantity and distribution of the liquid therein, and to enable the through-flow openings 19 for the diluting liquid to be flushed clean in an expedient manner. Furthermore, the opening 20 also prevents the liquid in the cylinder 3 from rising to the level of the shaft 8 and no liquid pressure can occur in the cylinder.

The opening 20 is suitably in the form of a preferably circular hole arranged centrally in one end wall of the diluting-liquid cylinder 3 and having a radius which is larger than the radius of the supporting member 8 and preferably larger than half the radius. The diluting-liquid cylinder 3 is suitably provided with securing means, screws and the like which are accessible from inside the cylinder, the securing means being easily reached through the opening 20 when removing or installing the cylinder.

This considerably simplifies the arrangement of a seal between the cylinder 3 and the stationary bearing installations, identified by the reference numeral 22 in the shown embodiment. The screening apparatus can therefore be constructed completely without stuffing boxes or similar kinds of sealing means, thus obviating the necessity of wear linings and coolant connections. With the embodiment according to the invention, the seal, which is identified by reference numeral 21, need only be in the form of a lip seal, which protects the bearing installation and shields against possible splashing of the liquid.

In has been found to advantage in a number of cases to vary the quantity of diluting liquid flowing from the cylinder 3, in the longitudinal direction thereof. When, for example, it is desired to reduce the amount of diluting liquid at the outlet end of the apparatus, the openings 19 at this end of the cylinder 3 are given a smaller through-flow area or, alternatively, the mutual distance between the openings is also increased. The openings are suitably in the form of round apertures having a diameter of approximately 10 mm and are spaced at approximately 40 mm apart. Finally, the reference numeral 23 identifies an opening in the casing 5 for carrying away the material which has passed through the cylindrical surface of the screening drum 4.

The apparatus operates in the following manner.

The material to be treated, e.g. a fiber-pulp suspension, is passed to the screening means through the inlet pipe 10 and, via the inlet portion 11, into the non-rotatable screening drum 4, where it is thrown by the blades 14 of the rotatable diluting-liquid cylinder 3 against the cylindrical surface of the drum 4. At the same time diluting liquid is passed from the inlet portion 13, 12 to the cover 15, which rotates together with the cylinder 3, and via the radially arranged, liquid dispensing guide vanes 16, through the openings 17 into the diluting-liquid cylinder 3.

As previously mentioned, the liquid in the cylinder 3 forms a solid of rotation 18, from which liquid is slung by centrifugal force out through the openings 19 in the cylindrical surface of the cylinder 3 into the interspacing between said cylinder and the drum 6. The pulp which passes through the perforations in the drum 4 departs through the outlet opening 23, while the particles which are unable to pass through said screening surface are carried through the drum, to be discharged from the apparatus through the opening in the outlet portion 6. The space within the diluting-liquid cylinder 3 also communicates, via the opening 20, with the said opening in the outlet portion 6.

With screening apparatus of the type referred to, an optimal screening effect is obtained at a determined speed of rotation of the rotor. The speed at which the diluting-liquid cylinder rotates in an apparatus constructed according to the invention is therefore a given magnitude. At this given speed, however, it has been found with prior art apparatus that disturbances in the flow of the rotating liquid cause uneven distribution of the diluting liquid flowing out through the openings in the cylindrical surface of the stationary screening drum. With the improved construction of the present invention, however, the diluting liquid, when introduced into the rotating cylinder 3, has substantially the same speed of rotation as the cylinder, thereby eliminating any disturbances which might otherwise deleteriously affect the the distribution of the diluting liquid.

What is claimed is:

1. An apparatus for screening aqueous suspensions, such as fibrous suspensions, comprising
   a casing;
   a non-rotatable screening means mounted substantially horizontally in said casing;
   said screening means being in the form of a cylindrical drum;
   an inlet means for supplying aqueous suspension to the interior of the drum;
   said drum having screen openings and being at least partially open to provide communication with said inlet means;
   an outlet means for carrying away reject particles separated from the suspension during such screening operation;
   a supply means for diluent liquid comprising a rotatable liquid-inlet chamber in which there are arranged guide vanes to cause the liquid to rotate;
   a rotatably mounted substantially horizontal distribution means for diluent liquid communicating with said diluting liquid supply means,
   said distribution means distributing, upon its rotation, the diluent liquid fed thereto out towards the surface of the screening drum;
   said diluent liquid supply means and said inlet means for supplying aqueous suspension being located at one end of the casing and said means being adapted to supply diluent liquid and aqueous suspension to the distribution means and to the screening drum, respectively, at the same end of the casing;
   said distribution means being floatingly supported from the one end of the casing at which end the supply means are located by means of a rotatably mounted member,
   said member being at least partially enclosed by the diluent liquid supply means; and
   an inspection portion provided in the end wall of said distribution means remote from said diluent liquid supply means.

2. An apparatus for screening aqueous suspensions, such as fibrous suspensions, comprising
   a casing;
   a non-rotatable screening means mounted substantially horizontally in said casing;
   said screening means being in the form of a cylindrical drum;

an inlet means for supplying aqueous suspension to the interior of the drum;

said drum having screen openings and being at least partially open to provide communication with said inlet means;

an outlet means for carrying away reject particles separated from the suspension during such screening operation;

a supply means for diluent liquid;

a rotatably mounted substantially horizontal distribution means for diluent liquid communicating with said diluting liquid supply means, said diluent liquid supply means comprising a rotatable liquid-inlet chamber in which there are arranged guide vanes extending radially outwards up to the periphery of the distribution means so as to cause the liquid to rotate prior to its entry into said distribution means;

said liquid-inlet chamber being frusto-conical and at its base portion merging with or lying adjacent to the cylindrical surface of said distribution means, which inlet chamber communicates at its narrow end with the inlet portion of the diluent liquid supply means, so that the vanes arranged in the liquid-inlet chamber impart to diluent liquid, prior to its entry into said distribution means, a speed of rotation which is substantially equal to that of the diluent liquid previously supplied to said means;

said distribution means distributing, upon its rotation, the diluent liquid fed thereto out towards the surface of the screening drum;

said diluent liquid supply means and said inlet means for supplying aqueous suspension being located at one end of the casing and said means being adapted to supply diluent liquid and aqueous suspension to the distribution means and to the screening drum, respectively, at the same end of the casing;

said distribution means being floatingly supported from the one end of the casing at which end the supply means are located by means of a rotatably mounted member, said member being at least partially enclosed by the diluent liquid supply means; and an inspection portion provided in the end wall of said distribution means remote from said diluent liquid supply means.

3. Apparatus as defined in claim 2, wherein said distribution means is provided with securing means which are accessible from within said distribution means, and wherein said securing means can be reached through said opening in the end wall of said distribution means.

4. Apparatus as defined in claim 2, wherein said distribution means has an undivided cylindrical surface, on which are arranged blades for distributing fibrous suspension along the inside of the cylindrical surface of said non-rotating screening drum.

5. Apparatus as defined in claim 2, wherein the two spaces on either side of the surface of said distribution means, i.e. the space within the means itself and the space outside the same, communicate with an outlet for removing particles separated from the suspension during the screening operation.

6. Apparatus as defined in claim 1, wherein said casing enclosing the distribution means and the screening drum is secured to a frame structure in a manner which enables said casing to be removed axially without dismantling the screening drum.

7. Apparatus as defined in claim 6, wherein the non-rotatable screening drum is attached to said frame structure in a manner which enables said drum to be removed axially without dismantling the same.

* * * * *